United States Patent [19]

Havlis

[11] 4,448,688

[45] May 15, 1984

[54] COUNTER FLOW SEPARATOR

[76] Inventor: Jerome F. Havlis, 223 N. Aldine, Park Ridge, Ill. 60068

[21] Appl. No.: 505,795

[22] Filed: Jun. 20, 1983

[51] Int. Cl.³ ............................................ B01D 21/26

[52] U.S. Cl. ................................ 210/512.3; 210/354; 210/369; 55/404

[58] Field of Search ............... 210/781, 784, 787, 780, 210/359, 360.1, 512.1, 512.3, 354, 355, 356, 379, 382, 377, 368, 371, 213, 214; 494/24, 49; 55/404, 405, 400, 399, 397, 398

[56] References Cited

U.S. PATENT DOCUMENTS

| | | | |
|---|---|---|---|
| 2,542,635 | 2/1951 | Davis | 55/399 |
| 2,646,921 | 7/1953 | Adams | 494/42 |
| 3,219,264 | 11/1965 | Cox | 494/37 |
| 3,797,662 | 3/1974 | Titus | 210/784 |
| 3,879,294 | 4/1975 | Ellis | 210/354 |

*Primary Examiner*—Ernest G. Therkorn
*Assistant Examiner*—John Donofrio
*Attorney, Agent, or Firm*—Richard W. Carpenter

[57] ABSTRACT

A counter flow separator, for removing solid particles from a liquid, which includes a housing with an internal, peripheral helical surface and a turbine rotatable therein for forcing liquid through the housing with the particles passing down the helical surface to the bottom of the housing and the liquid passing upwardly through and out of the housing, and wherein the force of the liquid causes the rotation of the turbine.

14 Claims, 2 Drawing Figures

COUNTER FLOW SEPARATOR

BACKGROUND OF THE INVENTION

1. Field of the Invention

This invention relates to separator devices and more particularly to a device for separating solid particles from liquids.

2. Description of the Prior Art

A prior art search in the United States Patent and Trademark Office disclosed the following U.S. Pat. Nos.: 1,810,922; 1,831,473; 2,073,520; 2,258,155; 2,337,291; 2,598,746; 2,646,921; 3,219,264; W. Germany Pat. Nos. 671,865 Italy Pat. No. 501,727.

None of the prior art uncovered in the search discloses a counter flow, separator having a stationary housing with an internal turbine which includes a hollow body with an outer diameter slightly less than the inner diameter of a helical surface in the housing, and having upper and lower shafts extending from the body, which are journaled in the housing and present spiral grooves which, when subjected to liquid pressure, cause the turbine to rotate within the housing.

SUMMARY OF THE INVENTION

It is an object of the invention to provide an improved counter flow separator for removing solid particles, such as steel fines, from liquids, such as oil.

Another object of the invention is the provision of a counter flow separator including a fixed housing and a rotatable turbine therein which is turned by pressure of the liquid being processed.

A more specific object of the invention is the provision of a counter flow separator including a housing and an internal turbine which includes a hollow body, having an outer diameter slightly less than the inner diameter of spiral lateral surface on the housing, and a pair of grooved shafts projecting from opposite ends of the body and journaled in the housing.

These and other objects of the invention will be apparent from an examination of the following description and drawings.

It will be understood that, for purposes of clarity, certain elements may have been intentionally omitted from certain views where they are believed to be illustrated to better advantage in other views.

DESCRIPTION OF THE PREFERRED EMBODIMENT

Figure 1:
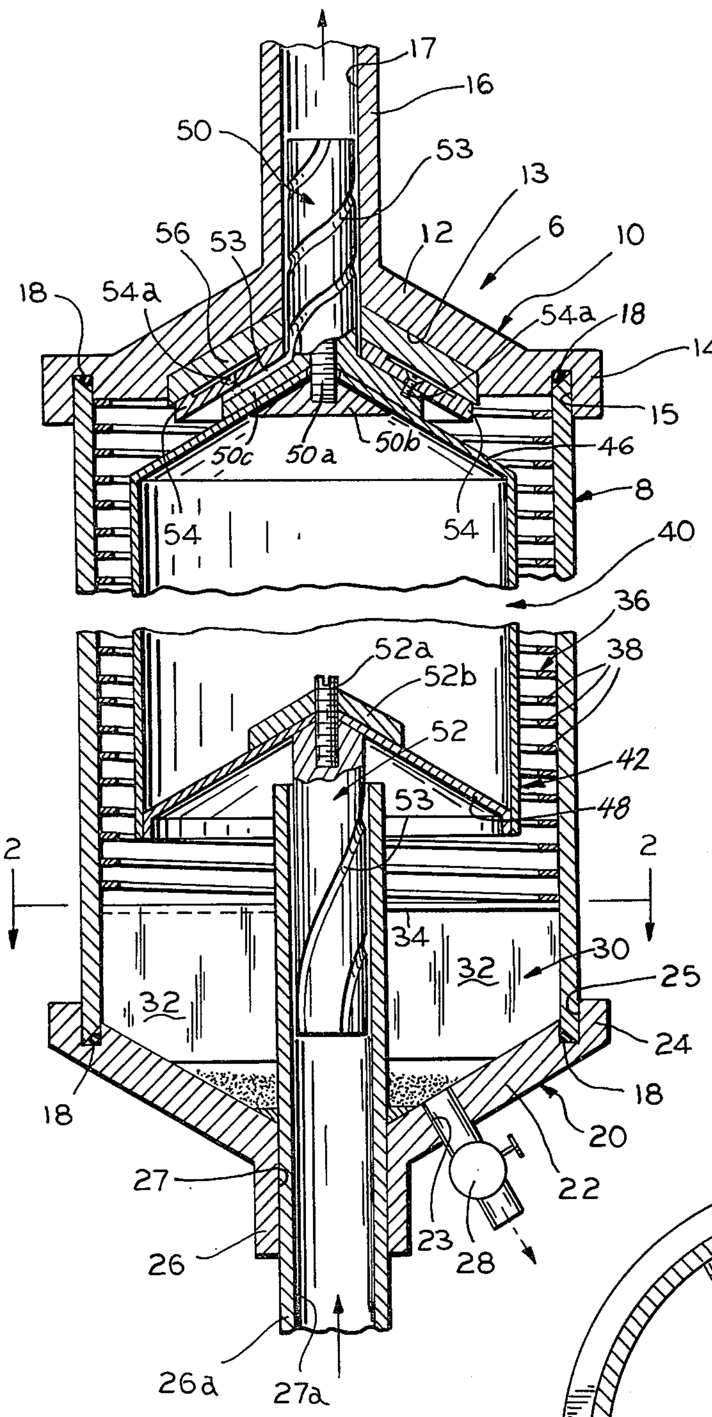
FIG. 1 is a fragmentary, vertical, cross-sectional view of a counter flow separator embodying features of the present invention.

Referring now to the drawings for a better understanding of the invention, and particularly to FIG. 1, it will be seen that the novel counter flow separator device of the invention includes a vertically disposed, stationary member or housing, indicated generally at 6, within which is mounted a rotational member or turbine, indicated generally at 40.

Housing 6 includes a cylindrical side wall 8 and a pair of upper and lower end caps 10 and 20, respectively, which are secured to the upper and lower ends of the side wall.

Upper end cap 10 includes an upwardly vaulted, conically shaped upper end wall 12 presenting on its inner or lower side a recess 13 for receiving a wear plate 56 described later in the specification. Upper end wall 12 has at its periphery an integral, circumferential, outer flange 14 presenting on its underside an annular threaded groove 15 for receiving the upper end of side wall 8, which is sealed therein by a gasket 18.

Housing 8 also includes an integral elongated collar or journal 16 projecting upwardly from upper end wall 12 and having extending therethrough a bore 17 communicating with the interior of the housing.

Lower end cap 20 is similar in construction to upper end cap 10, and includes a downwardly vaulted, conically shaped lower end wall 22 with an outer flange 24 presenting an upwardly facing groove 25 for receipt of the lower end of side wall 8. Lower end wall 22 also has projecting downwardly therefrom an integral, elongated collar or journal 26 having a bore 27 within which is secured a sleeve 26*a* having a bore 27*a* which is of the same diameter and in axial alignment with bore 17 of upper end cap collar 16.

Lower end wall 22 is provided near the center or lowest area thereof with an opening and clean out valve structure, indicated generally at 28, the purpose of which is described later in the specification.

Figure 2:
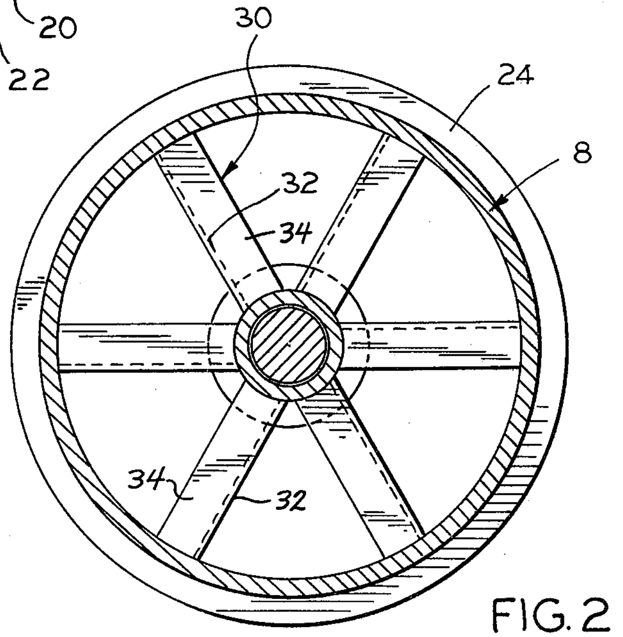
FIG. 2 is a transverse cross-sectional view of the structure illustrated in FIG. 1.

Located within the lower end of housing 6 is a sump structure 30 which, as best seen in FIG. 2, includes a plurality of radially extending, vertically disposed plates 32 having, projecting laterally from their upper edges, relatively narrow integral flanges 34.

Also, located within the housing 6, above sump structure 30, is a cylindrical spring 36 positioned against the inside surface of housing side wall 8 and presenting a helical surface 38 extending from the top of the housing side wall down to the sump structure 30.

The function of the sump structure 30 and helical surface 38 will be described in detail later in the specification.

As previously indicated, housing 6 is stationary and may be mounted on or supported by an appropriate type of frame structure, not shown.

Again referring to FIG. 1, it will be seen that mounted within housing 6 is a rotating member or turbine, indicated generally at 40.

Turbine 40 includes a hollow, cylindrical, air-tight body 42 having a side wall 44 and a pair of integral, upwardly vaulted, conically shaped upper and lower end walls 46 and 48, respectively.

Secured to and projecting outwardly from the upper and lower ends of body 42 are a pair of axially aligned upper and lower shafts 50 and 52 which are journaled in aligned bores 17 and 27*a* at the upper and lower ends, respectively, of housing 6.

If desired the turbine may be provided with a single shaft, not shown, which extends the entire length of the body and projects from opposite ends thereof.

In the present embodiment upper shaft 50 may be secured to the turbine body upper end wall 46 by means of a screw 50*a* and a conical nut 50*b* which is positioned within the turbine body.

Lower shaft 52 may also be secured to turbine body lower end wall 48 by means of a screw 52*a* and nut 52*b*.

Still referring to FIG. 1, it will be seen that both upper and lower shafts 50 and 52 are provided with one or more spiral grooves 53, the purpose of which is described later herein.

At its upper end the turbine body 42 may be provided with an annular frusto-conically shaped bearing plate 54 attached by screws 54*a* and which is adapted for engagement with a related wear plate 56 secured in recess 13 in the underside of housing upper end wall 12.

Now to describe the operation of the separator, it will be understood that the purpose of the device is to separate or remove from a liquid, such as oil, solid particles, such as metal fines, which are heavier than the liquid.

The liquid to be treated is pumped under pressure from a reservoir, not shown, into the lower end of turbine sleeve 26*a* and up against the lower end of lower shaft 52.

As this occurs the hydraulic pressure in the grooves causes the turbine to rotate in the housing. The liquid passes through the grooves 53 of the lower shaft 52 into the interior of the housing until liquid occupies all of the space except that occupied by the turbine itself.

As the pressure of the liquid causes the turbine to rotate, the rapid rotation of the turbine causes the liquid in the housing to be forced by centrifugal pressure radially outward against the side of the housing.

It should be noted that the outer diameter of the turbine body is only slightly less than the inner diameter of the housing helical spring surface 38. Thus, since the liquid does not have to be moved a great distance laterally, it can be moved more rapidly and with greater force.

As the liquid moves upwardly and out of the housing under pressure until enters the grooves 53 in the turbine upper shaft flange and shaft itself and exerts pressure to urge the shaft to continue rotating as the liquid passes out of the separator through bore 17 of collar 16.

When the liquid is forced radially outward from the turbine drum or body side wall, which is preferably splined or roughened, and against the spring 36, even though the majority of the liquid moves generally upwardly and out of the housing, as previously described, the solid particles P, which are heavier than the liquid, tend to ride down the helical surface 38 and into the sump area.

The liquid that does not move directly out of the upper end of the separator is recycled and again moved upwardly and against the side of the housing.

The plates 32 in the sump structure slow the circular flow of liquid in the lower end of the housing, so the particles can settle in the lower end and be removed periodically by means of the valve arrangement 28 in the housing lower end wall.

The unique design of the housing and turbine make it possible to utilize the hydraulic pressure of the liquid being processed, as it both enters and leaves the housing, to effect the rotation of the turbine which creates the centrifugal force required to process the liquid.

Thus, it will be understood that the invention provides a means for separating solid particles from a liquid in an extremely rapid and efficient process which utilizes equipment of relatively economical design and construction.

What is claimed:

1. In a counter flow separator for removing solid particles from liquid compositions, the combination of:

(a) a vertically disposed stationary housing having a cylindrical side wall and outwardly vaulted upper and lower end walls;

(b) said end walls presenting axially aligned openings and journal means for rotatably mounting axially aligned turbine shafts;

(c) said housing presenting inwardly adjacent said cylindrical side wall a generally laterally disposed helical surface extending between said end walls;

(d) said housing presenting in said lower end wall means for removing solids from said housing and presenting in said upper end wall means for removing purified liquid;

(e) a turbine mounted for rotation within said housing and including:

(i) a hollow body having a cylindrical side wall with an outer diameter slightly less than the inner diameter of said housing helical surface and having upwardly vaulted top and bottom walls;

(ii) shaft means extending from opposite ends of said body through said housing openings and journal means;

(iii) said shaft means including a cylindrical shaft having therein at least one spiral groove which extends from a free end of said shaft to the interior of said housing to permit liquid to enter and leave said housing whereby the hydraulic pressure of said liquid causes said turbine to rotate and force liquid in said housing to the side wall thereof.

2. A counter-flow separator, for removing solid particles from a liquid, comprising:

(a) a housing presenting adjacent a side wall thereof an internal helical surface extending between upper and lower end walls thereof said housing having an inlet extending through a lower end wall, an outlet for purified liquid extending through an upper end wall, and a solids outlet extending through a lower end wall;

(b) a turbine rotatably mounted in said housing and including a hollow body having:

(i) a side wall with an outer diameter slightly less than than the inner diameter of said helical surface;

(ii) shaft means extending from opposite ends of said body and journalled in said housing end walls;

(iii) said shaft means including spiral grooves extending therethrough to permit liquid to enter and leave said housing whereby the hydraulic pressure of said liquid causes said turbine to rotate and force liquid in said housing toward the side wall thereof.

3. A counter flow separator according to claim 2, wherein said housing has outwardly vaulted, conically shaped upper and lower end walls.

4. A counter flow separator according to claim 2, wherein the outer diameter of said turbine side wall is only slightly less than the inner diameter of said housing helical surface.

5. A counter flow separator according to claim 2, wherein said housing includes end walls having central openings and collars adjacent said openings for journalling said turbine shaft mean.

6. A counter flow separator according to claim 2, wherein said turbine is movable axially within said housing.

7. A counter flow separator according to claim 2, wherein said shaft means comprises a pair of separate axially aligned shafts secured to opposite ends of said turbine body.

8. A counter flow separator according to claim 2, wherein said housing helical surface is presented by a separate spring removably positioned within said housing.

9. A counter flow separator according to claim 2, wherein said housing includes a sump structure in the lower end thereof.

10. A counter flow separator according to claim 9, wherein said sump structure includes a plurality of vertically disposed plates extending radially from the center of said housing to the side wall thereof.

11. A counter flow separator according to claim 9, wherein said sump structure includes radially extending vertical plates and narrow horizontal flanges extending from the upper edges of said plates.

12. A counter flow separator according to claim 2, and including means for removing material from the lower end of said housing.

13. A counter flow separator according to claim 12, wherein said removal means includes an opening and a valve in a lower end wall of said housing.

14. A counter flow separator according to claim 2, wherein said turbine side wall has a roughened outer surface.

* * * * *